United States Patent
Joshi et al.

(10) Patent No.: US 7,602,840 B2
(45) Date of Patent: *Oct. 13, 2009

(54) ACQUISITION OF A GATED PILOT

(75) Inventors: Abhay A. Joshi, San Diego, CA (US); Arthur James Neufeld, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 833 days.

This patent is subject to a terminal disclaimer.

(21) Appl. No.: 10/873,431

(22) Filed: Jun. 21, 2004

(65) Prior Publication Data

US 2004/0228308 A1 Nov. 18, 2004

Related U.S. Application Data

(63) Continuation of application No. 09/927,869, filed on Aug. 9, 2001, now Pat. No. 6,795,489.

(51) Int. Cl.
*H04B 1/69* (2006.01)
*H04B 1/707* (2006.01)
*H04B 1/713* (2006.01)

(52) U.S. Cl. .................. 375/149; 375/150; 375/343; 375/362

(58) Field of Classification Search ............. 375/140, 375/141, 142, 144, 145, 147, 148, 149, 150, 375/343, 362, 434
See application file for complete search history.

(56) References Cited

U.S. PATENT DOCUMENTS

| | | | |
|---|---|---|---|
| 5,471,497 A | 11/1995 | Zehavi | |
| 6,157,631 A | 12/2000 | Rohani | |
| 6,421,373 B1 | 7/2002 | Saito | |
| 6,795,489 B2 * | 9/2004 | Joshi et al. | 375/149 |

(Continued)

FOREIGN PATENT DOCUMENTS

EP 0838910 4/1998

(Continued)

OTHER PUBLICATIONS

Forney, "Coset Codes—Part I: Introduction and Geometrical Classification," *IEEE Transactions on Information Theory*, vol. 34, No. 5, pp. 1123-1151, Sep. 1998.

(Continued)

*Primary Examiner*—Phuong Phu
(74) *Attorney, Agent, or Firm*—Alex C. Chen; Jeffrey D. Jacobs

(57) ABSTRACT

Systems and techniques to acquire a gated pilot signal by searching for a first gated pilot signal, deriving timing information from the search for the first gated pilot signal, and searching for a second gated pilot signal using the timing information. This can be implemented in a variety of fashions including a receiver with a searcher configured to generate a bit sequence, a correlator configured to correlate a received signal with the bit sequence, and a processor configured to detect a first gated pilot signal as a function of the correlation, derive timing information from the first gated pilot signal, and detect a second gated pilot signal by using the timing information to control the bit sequence generated by the searcher.

24 Claims, 6 Drawing Sheets

U.S. PATENT DOCUMENTS

2003/0007468 A1    1/2003    Joshi et al.

FOREIGN PATENT DOCUMENTS

| | | |
|---|---|---|
| EP | 1009105 | 6/2000 |
| JP | 09-503374 | 3/1997 |
| JP | 11-234172 | 8/1999 |
| JP | 2000-078110 | 3/2000 |
| JP | 2000-209131 | 7/2000 |
| JP | 2000-307474 | 11/2000 |
| JP | 2001-078269 | 3/2001 |
| WO | 0004648 | 1/2000 |
| WO | 0067399 | 11/2000 |
| WO | 0074292 | 12/2000 |
| WO | 0101596 | 1/2001 |
| WO | 0117125 | 3/2001 |
| WO | 0133744 | 5/2001 |

OTHER PUBLICATIONS

Wang et al., "Cell Search Algorithms and Optimization in W-CDMA," IEEE Vehicular Technoogy Conference New York, VTC-2000 Spring, vol. 1, pp. 81-86, May 15, 2000.

Siemens, Texas Instruments: "TSGR1-555/99, Adhoc 12," TSG-RAN WG1 Meeting N. Jun. 1-4, 1999, Cheju, Korea, pp. 1/2-2/2.

\* cited by examiner

ACQUISITION OF A GATED PILOT

CLAIM OF PRIORITY UNDER 35 U.S.C. §120

The present Application for Patent is a Continuation and claims priority to patent application Ser. No. 09/927,869 entitled "ACQUISITION OF A GATED PILOT" filed Aug. 9, 2001, now U.S. Pat. No. 6,795,489, assigned to the assignee hereof and hereby expressly incorporated by reference herein.

BACKGROUND

1. Field

The present invention relates generally to communications systems, and more specifically, to systems and techniques for acquisition of a gated pilot signal.

2. Background

Modern communications systems are designed to allow multiple users to share a common communications medium. One such communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-noise (PN) code that modulates a carrier, and thereby, spreads the spectrum of the signal waveform. The transmitted signals are separated in the receiver by a correlator that uses a corresponding PN code to despread the desired signal's spectrum. The undesired signals, whose PN codes do not match, are not despread in bandwidth and contribute only to noise.

In a CDMA communications system, a subscriber station may access a network, or communicate with other subscriber stations, through one or more base stations. Each base station is configured to serve all subscriber stations in a specific geographic region generally referred to as a cell. In some high traffic applications, the cell may be divided into sectors with a base station serving each sector. Each base station transmits a continuous pilot signal which is used by the subscriber stations for synchronizing with a base station and to provide coherent demodulation of the transmitted signal once the subscriber station is synchronized to the base station. The subscriber station generally establishes a communications channel with the base station having the strongest pilot signal.

Since a continuous pilot signal requires bandwidth that could otherwise be used to transmit information, some recently developed CDMA communications systems have employed gated pilot signals. By gating the pilot signal, additional bandwidth can be realized which increases the capacity of the base station. However, synchronizing the subscriber station to the gated pilot signal can be highly inefficient because the subscriber station may spend considerable resources searching for the pilot signal during periods where none is present.

SUMMARY

In one aspect of the present invention, a method of acquiring a gated pilot signal includes searching for a first gated pilot signal, deriving timing information from the search for the first gated pilot signal, and searching for a second gated pilot signal using the timing information.

In another aspect of the present invention, a receiver includes a searcher configured to generate a bit sequence, a correlator configured to correlate a received signal with the bit sequence, and a processor configured to detect a first gated pilot signal as a function of the correlation, derive timing information from the first gated pilot signal, and detect a second gated pilot signal by using the timing information to control the bit sequence generated by the searcher.

In yet another aspect of the present invention, computer-readable media embodying a program of instructions executable by a computer performs a method of acquiring a gated pilot signal, the method including searching for a first gated pilot signal, deriving timing information from the search for the first gated pilot signals, and searching for a second gated pilot signal using the timing information.

In a further aspect of the present invention, a receiver includes first detection means for detecting a first gated pilot signal, timing means for deriving timing information from the first gated pilot signal, and second detection means for detecting a second gated pilot signal by using the timing information.

In yet a further aspect of the present invention, a method of acquiring a gated pilot signal includes searching for a plurality of first gated pilot signals each comprising a bit sequence from a first coset, deriving timing information from the search for the first gated pilot signals, and searching for a plurality of second gated pilot signal using the timing information, each of the second gated pilot signals comprising a bit sequence from one of a plurality of cosets other than the first coset.

In another aspect of the present invention, a receiver includes a searcher configured to generate a bit sequence, a correlator configured to correlate a received signal with the bit sequence, and a processor configured to search for a plurality of first gated pilot signals by sequencing the searcher through a plurality of first bit sequences from a first coset, derive timing information as a function of the correlation of the received signal with each of the bit sequences from the first coset, and searching for a plurality of second gated pilot signals by sequencing the searcher through a plurality of bit sequences from each of a plurality of cosets other than the first coset and controlling the correlation thereof with the received signal as a function of the timing information.

In yet another aspect of the present invention, a method of establishing a communications channel includes transmitting from each of a plurality of first base stations a first gated pilot signal each comprising a bit sequence from a first coset, transmitting from each of a plurality of second base stations a second gated pilot signal each comprising a bit sequence from one of a plurality of cosets other than the first coset, searching from a subscriber station for the first gated pilot signals, and deriving timing information from the search for the first gated pilot signals, searching from the subscriber station for the second gated pilot signals using the timing information, and establishing a communications channel between the subscriber station and one of the first and second base stations based on the search for the first and second gated pilot signals.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings where.

DETAILED DESCRIPTION

The detailed description set forth below in connection with the appended drawings is intended as a description of exemplary embodiments of the present invention and is not intended to represent the only embodiments in which the present invention can be practiced. In some instances, the detailed description includes specific details for the purpose of providing a thorough understanding of the present invention. However, it will be apparent to those skilled in the art that the present invention may be practiced without these specific details. In other instances, well known structures and devices are shown in block diagram form in order to avoid obscuring the concepts of the present invention.

In an exemplary embodiment of a communications system, acquisition of a gated pilot signal can be achieved by employing a searching methodology that exploits certain characteristics of the gated pilot signal. By way of example, timing information from a gated pilot signal from one or more base stations may be used to search for additional gated pilot signals from other base stations in a CDMA communications system. Once the search is complete, a subscriber station can then readily identify the strongest gated pilot signal for acquisition. More specifically, the timing information from the gated pilot signal from one or more base stations may be used to predict when the remaining gated pilot signals will occur to reduce the overall search time. The timing information can be extracted from a gated pilot signal even if it is too weak for acquisition.

Although the various aspects of the present invention are described in the context of a CDMA communications system, those skilled in the art will appreciate that the techniques for acquiring a gated pilot signal described herein are likewise suitable for use in various other communications environment. Accordingly, any reference to a CDMA communications system is intended only to illustrate the inventive aspects of the present invention, with the understanding that such inventive aspects have a wide range of applications.

Figure 1:
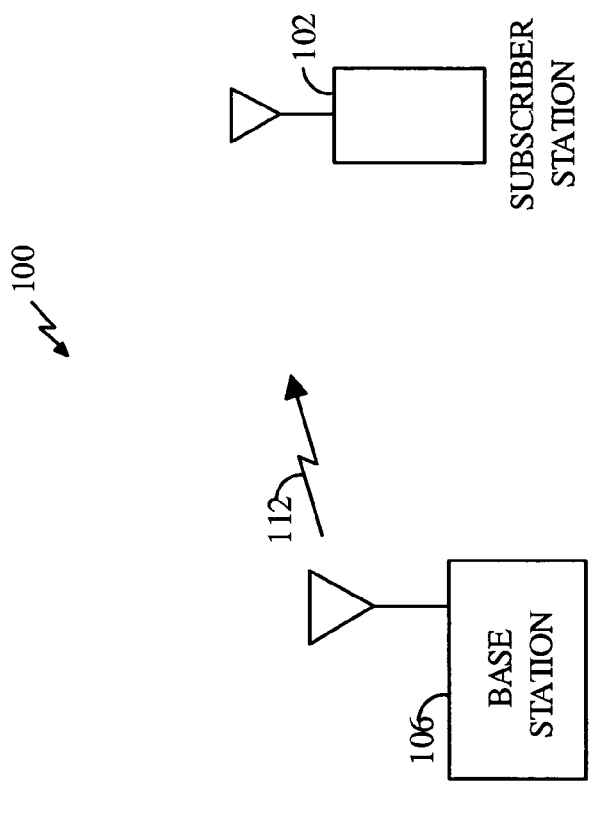
FIG. 1 is a system diagram of an exemplary communications system.
Figure 1:
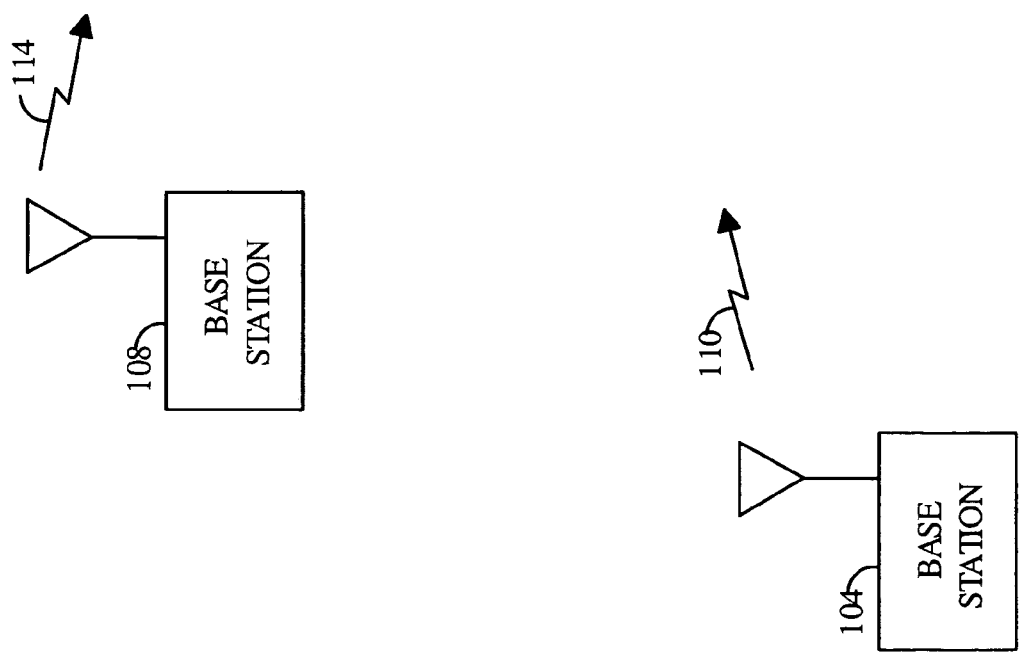

FIG. 1 is a system diagram of an exemplary communications system 100. The communications system provides a mechanism for a subscriber station 102 to access a network, or communicate with other subscriber stations, through one or more base stations. For ease of explanation, only three base stations 104, 106 and 108 are shown. However, as a matter of practice, numerous base stations will be operating with at least one base station located in every cell. Should the cells be divided into sectors, a base station would be located in each sector. In the described exemplary embodiment, each base station 104, 106 and 108 transmits a gated pilot signal 110, 112 and 114, respectively. The gated pilot signal is used by the subscriber station 102 for initial synchronization with a base station and to provide coherent demodulation of the transmitted signal once the subscriber station is synchronized to one of the base stations.

The gated pilot signal contains no data and is generally characterized as an unmodulated spread spectrum signal. The PN code used to spread each gated pilot signal 110, 112 and 114 should, therefore, be different to allow the subscriber station 102 to distinguish between the three base stations 104, 106 and 108. The PN code used to spread each gated pilot signal is known, a priori, by the subscriber station 102, and therefore, each gated pilot signal 110, 112 and 114 can be despread at the subscriber station through a correlation process with a locally generated PN code. A communications channel can then be established with the base station having the strongest gated pilot signal. Given relatively constant environmental conditions, the strongest gated pilot signal is generally transmitted from the base station in the closest proximity to the receiving subscriber station 102, in this case the base station 106.

The acquisition of the gated pilot signal generally entails a search throughout a region of time and frequency uncertainty in order to synchronize the received gated pilot signal with the locally generated PN code. In the described exemplary embodiment, the subscriber station 102 will perform this search three times, once for each gated pilot signal 110, 112 and 114. However, if all base stations are synchronized to one another such that the gated pilot signals from each base station occur at the same time, timing information from an initial search can be used to significantly reduce the region of uncertainty in time and frequency for additional searches. The synchronization of the base stations can be performed in any manner known in the art. By way of example, the base stations could be synchronized to a common time reference such as the Navstar Global Positioning satellite navigation system. With a synchronized communications system, the subscriber station 102 can perform a single search to detect, by way of example, the gated pilot signal 110 from the base station 104. The gated signal 110 can be used as a timing reference to locate the remaining gated pilot signals 112 and 114 even if the gated pilot signal 110 from the base station 104 is too weak for acquisition. As a practical matter, the initial search should include numerous gated pilot signals to reduce the probability that the timing reference will be corrupted by noise.

Although not limited in applicability, the searching methodology described above is particularly adaptable to CDMA communications systems. In CDMA communications systems, the gated pilot signal transmitted by each base station generally has the same PN code but with a different phase offset. The use of the same PN code is advantageous because it allows a subscriber station to access a base station with a search through a single PN code sequence for all phase offsets. The phase offset allows the gated pilot signal for each base station to be distinguished from one another.

The gated pilot signal transmitted by each base station is contained in a pilot channel of a forward link waveform. The forward link refers to transmissions from a base station to a subscriber station. The forward link waveform may take on various forms without departing from the inventive concepts described throughout. By way of example, the very nature of a "gated" pilot signal implies that the forward link channel structure, in its simplest form, includes at least one channel which is time-division multiplexed with the pilot channel. In the described exemplary embodiment, the pilot channel is time-division multiplexed with a traffic channel. The resulting forward link waveform is spread with a PN code, modulated onto a carrier waveform, amplified and transmitted into its respective cell or sector by a base station.

More complex forward link channel structures are also contemplated. By way of example, the traffic channel can be parsed into multiple code channels by spreading each traffic channel with an inner orthogonal code generated by using Walsh functions. Alternatively, the pilot channel can be spread with a Walsh cover, and additional code and time channels can be added to include a synchronization channel, paging channels, and traffic channels.

In CDMA communications systems, the PN code is periodic and typically chosen to be 32,768 chips per period with 512 phase offsets spaced apart by 64 chips. The pilot signal is spread by the PN code and transmitted in 32 pilot signal bursts per period. An exemplary CDMA communications systems employing this methodology is a High Data Rate (HDR) communications system. The HDR communications system is typically designed to conform to one or more standards such as the "cdma2000 High Rate Packet Data Air Interface Specification," 3GPP2 C.S0024, Version 2, Oct. 27, 2000, promulgated by a consortium called "$3^{rd}$ Generation Partnership Project." The contents of the aforementioned standard are incorporated by reference herein. In communications systems other than HDR, the length of the PN code for spreading the pilot signal may vary depending on a variety of factors. A short PN code facilitates faster acquisition time whereas a long PN code increases code processing gain. Those skilled in the art will be readily able to assess the performance tradeoffs to determine the optimal length for the PN code. In addition, the number of phase offsets, spacings, and pilot bursts per period can be varied to optimize system parameters.

Figure 2:
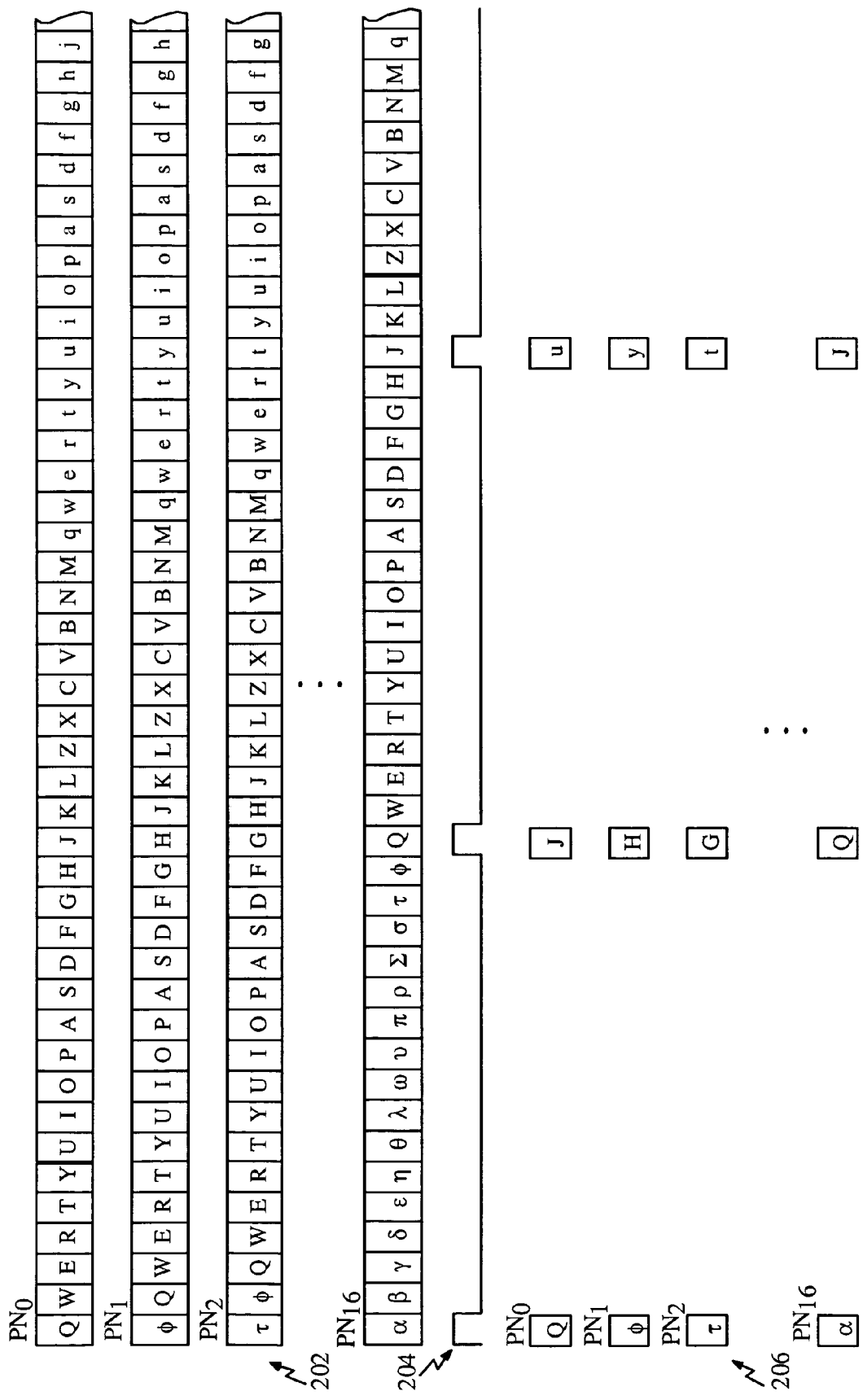
FIG. 2 is a timing diagram showing PN code sequences for several exemplary base stations operating in a CDMA communications system.

FIG. 2 is a timing diagram for an exemplary communications system showing sixteen PN codes 202 each being 32,768 chips long. For ease of explanation, the term "symbol" will be used as a shorthand convention for identifying a 64 chip PN code sequence with the understanding that the gated pilot signal contains no data. Using this convention, the 32,768 chip PN code can be represented by a 512 symbol sequence. Each PN code includes the same symbol sequence but offset in phase by one symbol.

Each PN code is used to spread a pilot signal. A gating function 204 is then applied to each spread spectrum pilot signal 202. For purposes of illustration, the gating function will be defined as a gate having a one symbol width and a sixteen symbol period. As a result of this gating function 204, sixteen different symbol sequences 206 are generated. The same symbol sequence is generated every sixteenth PN code phase offset as shown by $PN_0$ and $PN_{16}$. All gated pilot signals having the same symbol sequence, regardless of phase shift, can be grouped into a coset as follows:

$Coset_0: PN_0, PN_{16}, PN_{32}, \ldots PN_{496}$ $Coset_1: PN_1, PN_{17}, PN_{33}, \ldots PN_{497}$ $Coset_2: PN_2, PN_{18}, PN_{34}, \ldots PN_{498}$ $\vdots$ $Coset_{15}: PN_{15}, PN_{31}, PN_{47}, \ldots PN_{511}$ where the number of cosets can be defined as the number of PN code phase offsets divided by the number of pilot signal bursts per period. When searching for the pilot signal bursts from one coset, the pilot signal bursts from the other cosets will not be seen.

Figure 3:
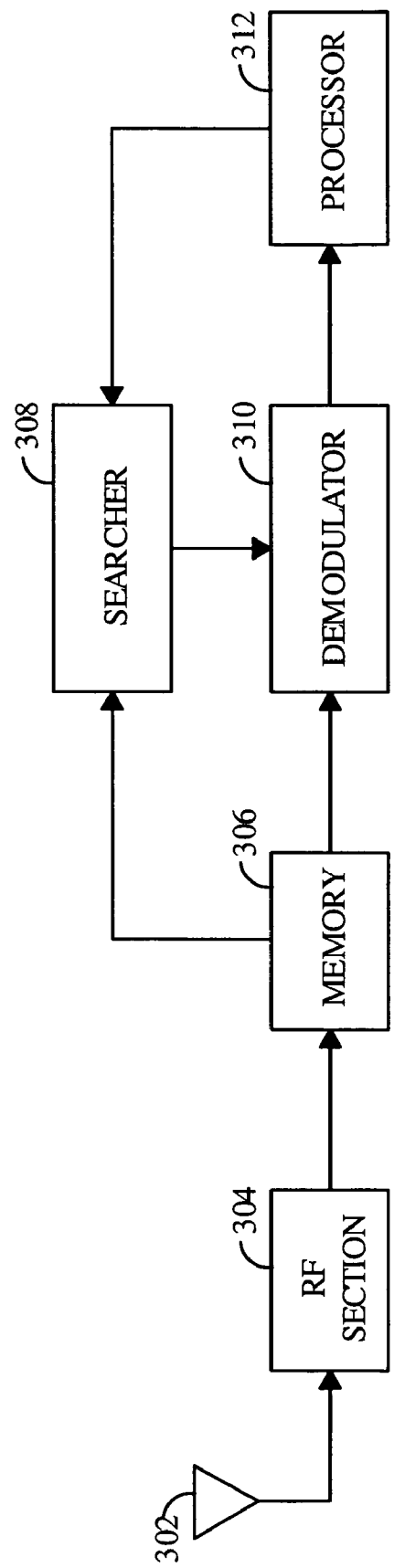
FIG. 3 is a block diagram of an exemplary receiver in a CDMA communications system.

FIG. 3 is a block diagram of an exemplary receiver in a subscriber station operating in a CDMA communications system. In the described exemplary embodiment, the signal transmissions from all the base stations are received through one or more antennas 302. The resulting superimposed signal received by the antenna 302 is provided to an RF section 304. The RF section 304 filters and amplifies the signal, downconverts the signal to baseband, and digitizes the baseband signal. The digital samples are provided to memory 306 for the purposes of acquisition. The memory 306 stores the number of chips equal to or greater than the period of the pilot signal burst. This approach should result in at least one gated pilot burst from each base station being captured in memory 306. An HDR communications system with 32 pilot signal bursts over a PN code sequence of 32,768 chips has a pilot signal burst period equal to 1024 chips.

The acquisition process involves searching through the digital samples stored in memory to find all the pilot signal bursts for one coset. This can be achieved by correlating the digital samples stored in memory with a locally generated PN code sequence. By way of example, a searcher 308 generates a symbol, i.e., a 64 chip PN code sequence, common to the gated pilot signals from each base station in the same coset. The symbol from the searcher 308 is coupled to a demodulator 310 where it is correlated with the digital samples stored in memory 306. The searcher 308 sequentially shifts the symbol in phase as part of a systematic search through the digital samples to find a corresponding symbol in memory 306. In the described exemplary embodiment, the locally generated gated PN code is available with delays that are spaced one-half chip apart. Other delays can be used depending on a variety of factors. Shorter delays increase correlation gain whereas longer delays reduce search time. Those skilled in the art will be readily able to assess the performance tradeoffs to determine the optimal incremental delay for the locally generated PN code. Once the locally generated PN code has been sequentially shifted in phase over the digital samples stored in memory 306, the searcher 308 generates the next sequential symbol common to the gated pilot signals from each base station in the searched coset. Similarly, the next symbol is correlated with the digital samples stored in memory 306 by sequentially shifting the symbol in phase by one-half chip increments. This process continues until all 32 symbols are correlated with the digital samples stored in memory 306.

The demodulator 310 can be implemented in a variety of fashions. By way of example, in CDMA communications systems, or any other type of communications system, which uses diversity techniques to combat fading, a RAKE receiver may be used. The RAKE receiver in a CDMA communications system typically utilizes independent fading of resolvable multipaths to achieve diversity gain. Specifically, the RAKE receiver can be configured to process one or more multipaths of the gated pilot signal. Each multipath signal is fed into a separate finger processor to perform PN code despreading with the locally generated PN code from the searcher 308. Walsh code decovering may also be provided by the RAKE receiver if needed. The RAKE receiver then combines the output from each finger processor to recover the gated pilot signal.

Figure 4:
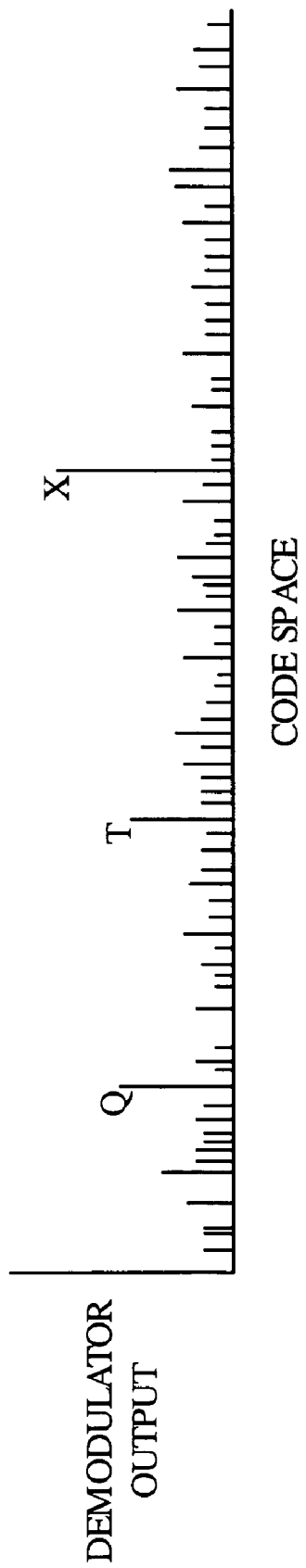
FIG. 4 is a code space diagram of the output of an exemplary demodulator used in a CDMA receiver.

The output of the demodulator is shown in FIG. 4 for all 32 correlated symbols as a function of code space. As shown in FIG. 4, the demodulator output will exhibit several energy peaks. Most of the energy peaks will be noise. However, pilot signal bursts from nearby base stations belonging to the searched coset should also appear as energy peaks at the demodulator output. The gated pilot signal bursts from the unsearched cosets will not be detected by the demodulator.

The output of the demodulator 310 is provided to a processor 312 (see FIG. 3). The processor implements an algorithm to select the base station having the strongest pilot signal based on the demodulated output. One method entails searching each coset for pilot signal bursts from each base station, storing the detected pilot signal bursts in memory, and selecting the base station having the strongest pilot signal burst. In the exemplary HDR communications system, there are sixteen cosets.

Figure 5:
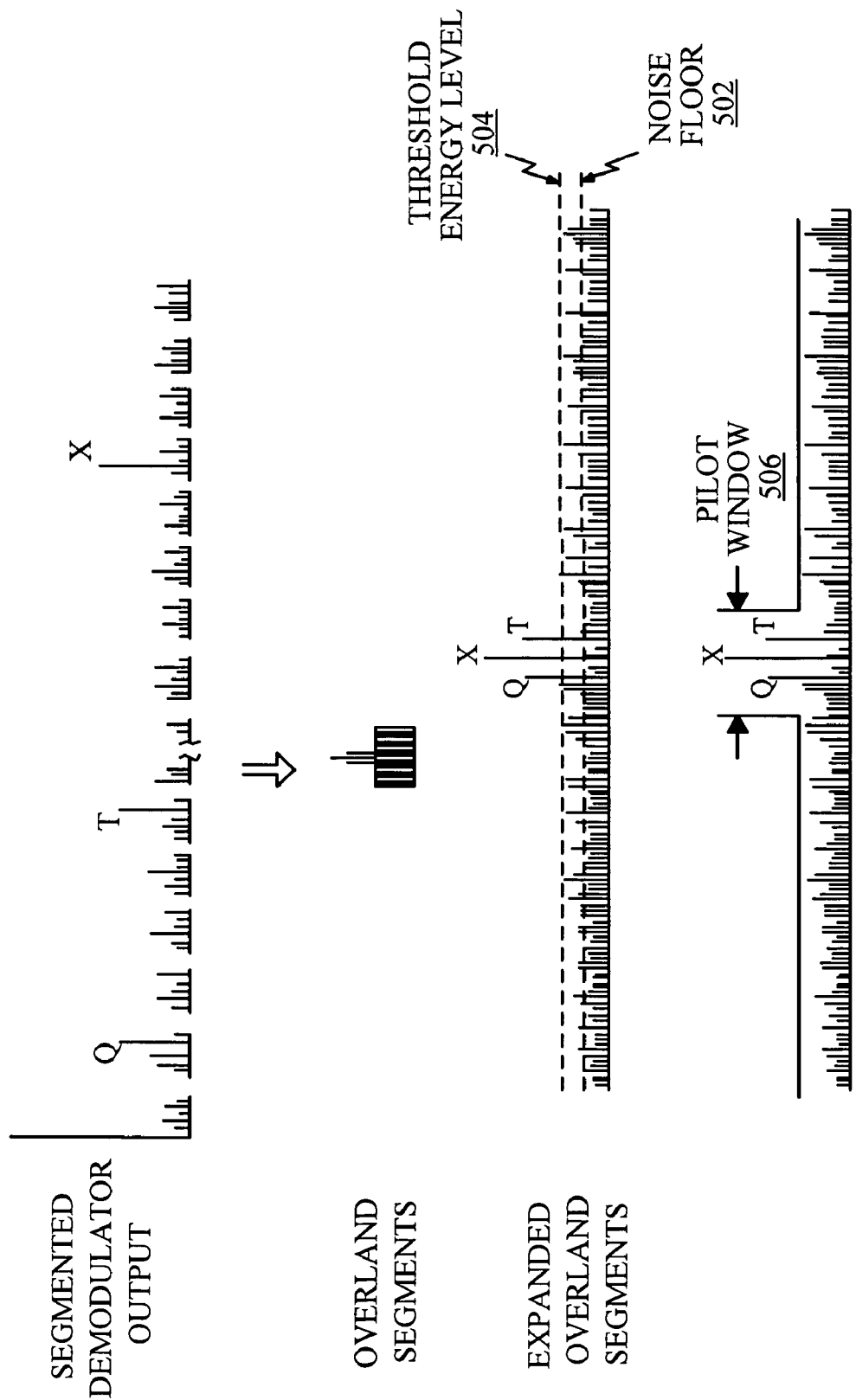
FIG. 5 is a code space diagram of a processed version of the exemplary demodulator output of FIG. 4.

Alternatively, the processor could implement an algorithm that uses the timing information from the search from one coset to reduce the search time of the remaining cosets. By way of example, after the initial coset search, an algorithm can be used to decimate the demodulator output into 32 segments, each segment representing in time the correlation of the digital samples stored in memory with one symbol of the locally generated PN code. The 32 segments can then be overlaid on one another as shown in FIG. 5. Because, the gated pilot bursts are synchronized to a common time reference, the energy peaks representing the pilot signal bursts will cluster within a small region.

To separate the noise peaks from the pilot signal bursts, the processor may employ any number of techniques. A thresholding technique can be employed that identifies all energy peaks that fall below 2 of the strongest energy peaks and averages these identified energy peaks to compute a noise floor 502. Once the noise floor 502 has been computed, a threshold energy level 504 may be computed where all energy peaks above the threshold would be considered pilot signal bursts, and those below considered noise. By way of example, a threshold could be set at a fixed energy level above the computed noise floor. Alternatively, a threshold could be established at a certain energy level below the strongest energy peak. In at least one embodiment, a threshold value of 3 dB above the computed noise floor is used. With this approach, energy peaks with a signal-to-noise ratio of at least 3 dB would be detected by the processor as pilot signal bursts.

Since the demodulator output has been decimated into 32 segments and folded in time such that pilot signal bursts from the PN code phase offsets will fall on top of each other, then all energy peaks representing a pilot signal burst should fall within a small pilot window 506 around the maximum energy peak. The pilot window 506 should be sized to allow for multipath delays, as well as errors due to the lack of frequency lock. In at least one embodiment, the pilot window is 64 chips and centered at the maximum energy peak.

If the thresholding operation fails to detect any energy peaks above the computed threshold, or if the energy peaks exceeding the computed threshold energy level 504 fall outside the allowable pilot window 506, the search for a pilot signal burst within this coset will be considered unsuccessful. In that event, the digital samples stored in memory would be updated and correlated with the PN code for the next coset.

The algorithm implemented by the processor to determine whether the thresholding operation has failed may vary depending on the communications environment, the particular application, the overall design constraints, and other relevant factors. By way of example, the algorithm could require that a minimum number of energy peaks exceed the computed threshold energy level 504 to detect a pilot signal burst. The minimum number could be constant or varying. The variance could be a function of the strength of the energy peaks detected. In addition, the algorithm could require that all energy peaks that exceed the computed threshold energy level 504 fall within the pilot window 506, or alternatively, only a certain percentage. The percentage of energy peaks above the computed threshold and falling within the pilot window can be constant or variable. The variance could be a function of the strength of the energy peaks exceeding the computed threshold energy level 504 or the number of energy peaks exceeding the computed threshold energy level 504. Various other algorithms will be apparent to those skilled in the art and are within the scope of the present invention.

Once a pilot signal burst within a coset has been detected by the processor, the processor will have a sense of pilot signal burst timing. With this information, the locally generated PN code no longer needs to be sequentially shifted in phase through all digital samples stored in memory. Instead, the processor can estimate the phase offset of the locally generated PN code to properly align it with the corresponding PN code stored in memory. The estimated phase offset can be used to restrict the correlation process within a specific number of chips. In at least one embodiment, the locally generated PN code is sequentially shifted in phase over a 64 chip portion of the digital samples stored in memory in one-half chip increments.

Figure 6:
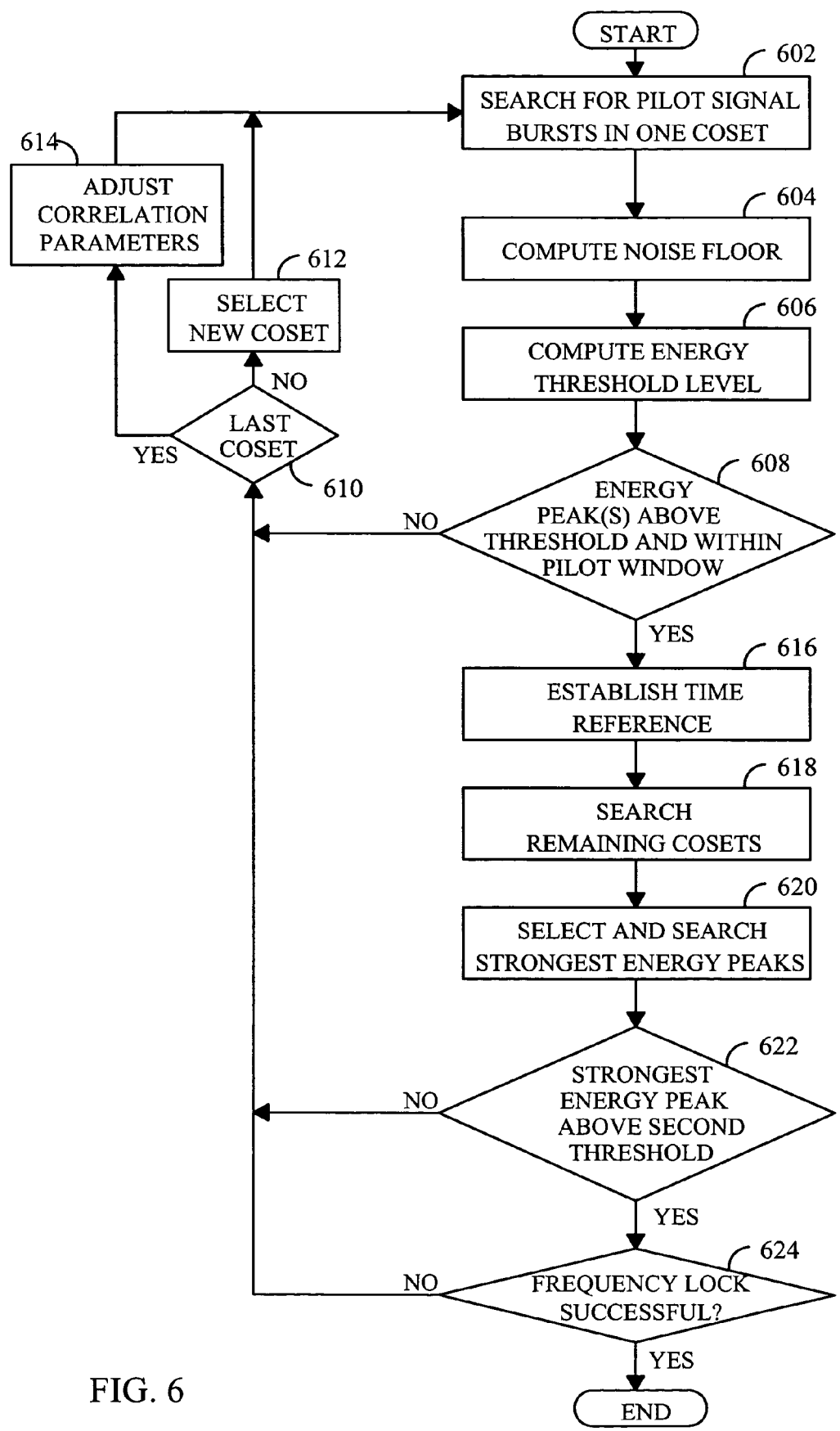
FIG. 6 is a flow chart illustrating an exemplary algorithm performed by a processor in a CDMA receiver.

An exemplary algorithm implemented by the processor is illustrated by the flow chart of FIG. 6. In block 602, the processor stores digital samples of the base station signal transmissions in memory. In the described exemplary HDR communications system, each base station transmits 32 pilot signal bursts over a 32,768 chip period. Consequently, the digital samples stored in memory should be at least 1024 chips to ensure at least one pilot burst is captured. In at least one embodiment, 2048 chips are stored in memory to increase noise immunity during the correlation process. The stored digital samples are then correlated with a locally generated PN code under control of the processor. The correlated results are decimated into 32 segments and overlaid on one another as shown in FIG. 5.

The overlaid segments of the correlated results are used to compute a number of parameters. In block 604, a noise floor is computed. Based on the noise floor computation, a threshold energy level is computed in block 606. The noise floor and threshold energy level can be computed in the manner described above in connection with FIG. 5, or in any other manner known in the art. The overlaid segments of the correlated results are then compared against the threshold energy level in block 608. If all of the energy peaks exceeding the computed threshold energy level do not fall within ±32 chips from the strongest energy peak, i.e., the pilot window, or if no energy peaks exceed the computed energy threshold, the search for a pilot signal burst has failed.

If the search for the pilot burst has failed, the processor will determine whether all 16 cosets have been searched in block 610. If one or more cosets have not been searched, then the processor will select one of the unsearched cosets in block 612 and loop back to block 602 to repeat the search process. Conversely, if all the 16 cosets have been searched, the processor will adjust one or more correlation parameters in block 614 before looping back to block 602.

The specific adjustments to the correlation parameters are application dependent, and may vary depending on the communications environment and the overall design constraints. By way of example, the chip length of the locally generated PN code can be adjusted. If the correlation process fails to detect a pilot signal burst during a 16 coset search using a 64 chip locally generated PN code, the correlation process can be repeated with a 96 chip locally generated PN code to improve noise performance. A longer locally generated PN code provides increased noise immunity but is more sensitive to frequency offset and drift. In communications environments with highly accurate and stable oscillators, the initial 16 coset search might be performed using a 96 chip locally generated PN code.

Another correlation parameter includes the incremental phase delay of the locally generated PN code. If the correlation process fails to detect a pilot signal burst during a 16 coset search by sequentially incrementing the locally generated PN code in phase by one-half chip increments, a subsequent correlation process could be performed with one-quarter chip increments in phase of the locally generated PN code. Shorter delays result in higher correlation gain, but increase the time required to search a coset. Other correlation parameters include the algorithms for computing the noise floor, the threshold energy level, and the width of the pilot window.

If all the energy peaks exceeding the threshold fall within ±32 chips from the strongest energy peak, then a time reference will be established in block 616 based on the position of the strongest energy peak. In block 618, the timing reference is used to search for all remaining pilot signal bursts, i.e., 512 pilot signal bursts, with a search window of 64 chips. The width of the search window should be sized to allow for multipath delays, as well as errors due to the lack of frequency lock.

Once all 16 cosets have been searched, the strongest energy peaks are selected, and the corresponding gated pilot signals are correlated a second time in block 620. In the exemplary described embodiment, the 16 strongest pilot signal bursts are selected. However, those skilled in the art will appreciate that any number of pilot signal bursts could be selected. Alternatively, the strongest pilot signal burst could simply be selected at this point for acquisition. The second correlation process entails updating the digital samples in memory and correlating the updated digital samples with the locally generated PN code for each coset that contains one or more of the selected pilot signal bursts. The timing information from the selected pilot signal bursts can be used to update the estimated phase offset to restrict the correlation process to a fewer number of chips than used to search the cosets in block 618. In the described exemplary embodiment, the locally generated PN code is sequentially shifted in phase over an 8 chip portion of the digital samples stored in memory in one-half chip increments.

In block 622, the strongest of the 16 pilot signal bursts, as determined by the second correlation process, is identified. The strongest pilot signal burst is then compared to a second threshold energy level. The second threshold energy level is generally set to the minimum energy level required to achieve frequency lock. If the strongest pilot signal burst is below the second threshold energy level, then the search for a gated pilot burst signal has failed. As a result, the processor will loop back to block 610 to determine whether all 16 cosets have been searched. If one or more cosets have not been searched, then the processor will select one of the unsearched cosets in block 612 and loop back to block 602 to repeat the search process. Conversely, if all the 16 cosets have been searched, the processor will adjust one or more correlation parameters in block 614 before looping back to block 602.

If the strongest pilot signal burst exceeds the second threshold energy level, then the demodulator will attempt to lock to the carrier frequency in block 624. If the demodulator successfully locks to the carrier frequency, the acquisition process is complete and a communications channel can now be established with the base station. If the demodulator is unable to lock to the carrier frequency, then the search for a gated pilot burst signal has failed. As a result, the processor will loop back to block 610 to repeat the search process with the same or different correlation parameters.

Although the exemplary processor algorithm described in connection with FIG. 6 includes various sequential blocks, those skilled in the art will appreciate that the sequence of blocks may be altered to optimize processor resources, or alternatively, one or more blocks may be processed in parallel. Moreover, one or more blocks could be omitted, or additional blocks known in the art could be used, either alone or in combination with one or more of the described algorithmic blocks set forth in FIG. 6.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:

receiving a plurality of first gated pilot signals from a plurality of first base stations, each first gated pilot signal comprising a bit sequence from a first coset;

receiving a plurality of second gated pilot signals from a plurality of second base stations, each second gated pilot signal comprising a bit sequence from a second coset, the second coset comprising different bit sequences than the first coset, each of the bit sequences from the first and second cosets comprises a pseudo-noise code;

searching for at least one first gated pilot signal at a subscriber station, and deriving timing information from the search for the at least one first gated pilot signal;

searching for at least one second gated pilot signal at the subscriber station using the timing information; and establishing a communications channel between the subscriber station and one of the first and second base stations based on the search for the first and second gated pilot signals;

wherein deriving timing information from the search for the at least one first gated pilot signal comprises:

segmenting an output from the search for the at least one first gated pilot signal;

overlaying segments of the output; and determining a pilot signal window around a gated pilot signal found during the search for the at least one first gated pilot signal.

2. The method of claim 1, further comprising identifying a strongest gated pilot signal found from the searched at least one first gated pilot signal and at least one second gated pilot signal.

3. The method of claim 1, further comprising synchronizing the first gated pilot signals and the second gated pilot signals.

4. The method of claim 1, wherein each bit sequence in the first coset has a different phase offset from other bit sequences in the first coset.

5. The method of claim 1, further comprising adjusting the pilot signal window.

6. A method comprising:

transmitting a plurality of first gated pilot signals from a plurality of first base stations, each first gated pilot signal comprising a bit sequence from a first coset;

transmitting a plurality of second gated pilot signals from a plurality of second base stations, each second gated pilot signal comprising a bit sequence from a second coset, the second coset comprising different bit sequences than the first coset, each of the bit sequences from the first and second cosets comprises a pseudo-noise code;

searching for at least one first gated pilot signal at a subscriber station, and deriving timing information from the search for the at least one first gated pilot signal;

searching for at least one second gated pilot signal at the subscriber station using the timing information;

establishing a communications channel between the subscriber station and one of the first and second base stations based on the search for the first and second gated pilot signals; and determining a noise floor from searching for at least one first gated pilot signal.

7. A method comprising:

transmitting a plurality of first gated pilot signals from a plurality of first base stations, each first gated pilot signal comprising a bit sequence from a first coset;

transmitting a plurality of second gated pilot signals from a plurality of second base stations, each second gated pilot signal comprising a bit sequence from a second coset, the second coset comprising different bit sequences than the first coset, each of the bit sequences from the first and second cosets comprises a pseudo-noise code;

searching for at least one first gated pilot signal at a subscriber station, and deriving timing information from the search for the at least one first gated pilot signal;

searching for at least one second gated pilot signal at the subscriber station using the timing information;

establishing a communications channel between the subscriber station and one of the first and second base stations based on the search for the first and second gated pilot signals; and determining a threshold energy level from searching for at least one first gated pilot signal.

8. A method comprising:

transmitting a plurality of first gated pilot signals from a plurality of first base stations, each first gated pilot signal comprising a bit sequence from a first coset;

transmitting a plurality of second gated pilot signals from a plurality of second base stations, each second gated pilot signal comprising a bit sequence from a second coset, the second coset comprising different bit sequences than the first coset, each of the bit sequences from the first and second cosets comprises a pseudo-noise code;

searching for at least one first gated pilot signal at a subscriber station, and deriving timing information from the search for the at least one first gated pilot signal;

searching for at least one second gated pilot signal at the subscriber station using the timing information;

establishing a communications channel between the subscriber station and one of the first and second base stations based on the search for the first and second gated pilot signals; and adjusting a correlation parameter if no first gated pilot signal is found above a threshold energy level during the search for at least one first gated pilot signal.

9. The method of claim 8, wherein the correlation parameter comprises at least one of (a) a chip length of a bit sequence used to search for at least one first gated pilot signal, (b) an incremental phase delay of the bit sequence used to search for at least one first gated pilot signal, and (c) the threshold energy level.

10. The method of claim 1, further comprising locking to a carrier frequency based on the search for the first and second gated pilot signals.

11. A system comprising:

a first base station configured to transmit a first gated pilot signal, the first gated pilot signal comprising a bit sequence from a first coset;

a second base station configured to transmit a second gated pilot signal, the second gated pilot signal comprising a bit sequence from a second coset, the second coset comprising different bit sequences than the first coset, each of the bit sequences from the first and second cosets comprises a pseudo-noise code;

a receiver configured to:

search for the first gated pilot signal and derive timing information from the search for the first gated pilot signal;

search for the second gated pilot signal using the timing information; and establish a communications channel between the receiver and one of the first and second base stations based on the search for the first and second gated pilot signals;

wherein the receiver is configured to derive the timing information by segmenting an output from the search for the first gated pilot signal into segments, overlaying the segments, and determining a pilot signal window around a gated pilot signal found during the search for the first gated pilot signal.

12. The system of claim 11, wherein the base stations are configured to transmit code division multiple access (CDMA) signals.

13. The system of claim 11, wherein the receiver is configured to identify a strongest gated pilot signal found from the searched first gated pilot signal and second gated pilot signal.

14. A device comprising:
a searcher configured to generate a plurality of different bit sequences;
a correlator configured to correlate a received signal with the plurality of different bit sequences; and
a processor configured to:
detect a first gated pilot signal as a function of the correlation of the received signal and the plurality of different bit sequences;
derive timing information from the first gated pilot signal;
detect a second gated pilot signal by using the timing information to control at least one bit sequence generated by the searcher;
segment the correlation of the received signal and the plurality of different bit sequences from the correlator;
overlay segments of the correlation of the received signal and the plurality of different bit sequences from the correlator; and
detect the first gated pilot signal within a time window of the overlaid correlation.

15. The device of claim 14, wherein the different bit sequences comprise pseudo-noise codes.

16. The device of claim 14, wherein the different bit sequences comprises at least two cosets of bit sequences.

17. A method comprising steps of:
performing a search for at least one first gated pilot signal at a subscriber station, the first gated pilot signal comprising a pilot symbol sequence, the first gated pilot symbol being from a first coset;
deriving timing information from the search for the at least one first gated pilot signal; and
searching at the subscriber station for at least one second gated pilot signal at the subscriber station using the timing information, the second gated pilot symbol comprising the pilot symbol sequence, the second gated pilot signal being from a second coset, the second gated pilot signal being synchronized to the first gated pilot signal;
wherein deriving timing information from the search for the at least one first gated pilot signal comprises:
segmenting an output from the search for the at least one first gated pilot signal;
overlaying segments of the output; and
determining a pilot signal window around a gated pilot signal found during the search for the at least one first gated pilot signal.

18. The method of claim 17, further comprising:
establishing a communications channel between the subscriber station and a base station transmitting one of the first and second gated pilot symbols using at least one of the first and second gated pilot signals.

19. The method of claim 18, wherein the communication channel is a Code Division Multiple Access (CDMA) channel, and the pilot symbol sequence is a pseudo-noise (PN) sequence.

20. The method of claim 19, wherein the first gated pilot signal is too weak for acquisition by the subscriber station at the time of the steps of performing and deriving.

21. A machine-readable medium comprising instructions, wherein when the instructions are executed by at least one controller of a wireless subscriber station, the instructions cause the wireless subscriber station to:
perform a search for at least one first gated pilot signal at a subscriber station, the first gated pilot signal comprising a pilot symbol sequence, the first gated pilot symbol being from a first coset;
derive timing information from the search for the at least one first gated pilot signal by segmenting an output from the search for the at least one first gated pilot signal into segments, overlaying the segments, and determining a pilot signal window around a gated pilot signal found during the search for the at least one first gated pilot signal; and
search at the subscriber station for at least one second gated pilot signal at the subscriber station using the timing information, the second gated pilot symbol comprising the pilot symbol sequence, the second gated pilot signal being from a second coset, the second gated pilot signal being synchronized to the first gated pilot signal.

22. The machine-readable medium of claim 21, wherein the instructions further cause the wireless subscriber station to:
establish a communications channel between the subscriber station and a base station transmitting one of the first and second gated pilot symbols using at least one of the first and second gated pilot signals.

23. The machine-readable medium of claim 22, wherein the communication channel is a Code Division Multiple Access (CDMA) channel, and the pilot symbol sequence is a pseudo-noise (PN) sequence.

24. The machine-readable medium of claim 23, wherein the first gated pilot signal is too weak for acquisition by the subscriber station at the time of performing and deriving.

* * * * *